(12) United States Patent
Surti et al.

(10) Patent No.: US 6,496,193 B1
(45) Date of Patent: Dec. 17, 2002

(54) METHOD AND APPARATUS FOR FAST LOADING OF TEXTURE DATA INTO A TILED MEMORY

(75) Inventors: Prasoonkumar B. Surti, Folsom, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,706

(22) Filed: Dec. 30, 1999

(51) Int. Cl.[7] .............................................. G06T 11/40
(52) U.S. Cl. ........................ 345/552; 345/582; 345/531
(58) Field of Search ................................. 345/552, 572, 345/564, 531, 530, 545, 582

(56) References Cited

U.S. PATENT DOCUMENTS

| | | | |
|---|---|---|---|
| 5,263,136 A | 11/1993 | DeAguiar et al. | 395/164 |
| 5,675,826 A | 10/1997 | Manze et al. | 395/800 |
| 5,736,988 A | 4/1998 | Shaw et al. | 345/423 |
| 5,781,200 A | 7/1998 | Lu et al. | 345/516 |
| 5,815,168 A | 9/1998 | May | 345/516 |
| 5,828,382 A | 10/1998 | Wilde | 345/501 |
| 5,877,780 A | 3/1999 | Lu et al. | 345/519 |
| 6,029,240 A | * 2/2000 | Blaner et al. | 712/207 |
| 6,104,418 A | * 8/2000 | Tanaka et al. | 345/552 |
| 6,233,647 B1 | * 5/2001 | Bentz et al. | 345/557 |
| 6,353,438 B1 | * 3/2002 | Van Hook et al. | 345/552 |

* cited by examiner

Primary Examiner—Kee M. Tung
(74) Attorney, Agent, or Firm—Blakely, Sokoloff, Taylor & Zafman LLP

(57) ABSTRACT

An apparatus for loading texture data into a tiled memory includes state machine logic to generate a sequence of addresses for writing a cacheline of texture data into the tiled memory according to Y-major tiling. The cacheline comprises quadwords (QWs) 0–3, wherein the sequence corresponds to an ordering of the QWs 0–3, ordered as either: (a) QW0, QW1, QW2, QW3; (b) QW1, QW0, QW3, QW2; (c) QW2, QW3, QW0, QW1; or (d) QW3, QW2, QW1, QW0, depending upon a starting address.

20 Claims, 4 Drawing Sheets

| | QUADWORD ADDRESS ORDERING FOR WRITING A CACHELINE OF TEXTURE DATA |
|---|---|
| SEQUENCE A | 0, 1, 2, 3 |
| SEQUENCE B | 1, 0, 3, 2 |
| SEQUENCE C | 2, 3, 0, 1 |
| SEQUENCE D | 3, 2, 1, 0 |

…

METHOD AND APPARATUS FOR FAST LOADING OF TEXTURE DATA INTO A TILED MEMORY

FIELD OF THE INVENTION

The present invention relates generally to the field of graphics processing; more particularly, to methods and apparatus directed to efficiently loading and accessing data in a graphics processing system.

BACKGROUND OF THE INVENTION

A requirement of a modern computer graphics processing system is that it be capable of manipulating and performing calculations on huge quantities of data at very fast speeds. This has led researchers to search for better techniques for handling and storing data to be output to a display device in real-time.

The demand for more efficient methods and circuits for dealing with graphics data continues to grow rapidly. The increased use of techniques for three-dimensional texturing (solid texturing), modeling, and shading in computer graphics and animation has fueled this demand. For example, it is now possible for three-dimensional objects and shapes created on a personal computer or workstation to be filled in with textures simulating natural materials and natural phenomena. Realistic images having textures resembling marble, wood, or stone are now commonly displayed. Likewise, computer researchers and scientists have successfully simulated natural phenomena such as fog, waves, fire, and clouds for display on a computer screen.

A "texture"—sometimes referred to as a "pattern" or "wallpaper"—is simply an image that is used as surface covering for objects or shapes created by a graphics program running on a computer. Textures come in many varieties. Examples include bump mapping, which simulate the appearance of surface bumps without actually modifying the geometry of the object; light maps which give the appearance of smooth diffuse lighting; displacement mapping, in which textures are used actually to move the surface; and solid textures that give consistent textures of all surfaces of an object regardless of distortions of the surface parameter space.

A texture may be explicitly specified by storing all the complex details of the scene or sequence in a bit-map that contains the value of each pixel (called a "texel" when referring to texture data) in the image. This obviously requires a large amount of storage space within the computer as well as an advanced graphics processing subsystem. Typically, the processor of a computer graphics subsystem loads the texture data into memory before is used by the graphics application. Since the end-user must wait for the texture data to be completely loaded into memory before starting the application (e.g., playing a video game), it is desirable to reduce this time as much as possible.

One architectural technique for increasing the memory access speed of graphics data is a "tiled" memory organization. In a tiled memory, the memory mapped for the display screen is translated into tiles within the memory (e.g., DRAM) in a way that permits fast access of neighboring pixels in the array. By way of example, U.S. Pat. No. 5,736,988 teaches an apparatus and method for storing graphics data as a collection of individual addressable tiles for fast retrieval in a computer system. As further background, U.S. Pat. Nos. 5,877,780 and 5,781,200 both disclose a tiled memory architecture for storing graphics data. The memory mapping taught involves a translation between a received linear address (representing a screen pixel location and color) to a physical address stored in within the DRAM.

U.S. Pat. No. 5,828,382 of Wilde describes a graphics subsystem that includes graphics hardware for permitting graphics texture maps to be dynamically cached internally within the graphics hardware. Textures are stored in system memory in a tile format that allows an entire cache tile to be stored linearly in memory space. According to Wilde, storing the textures in a tiled linear format allows the graphics processor to fetch the tile across the peripheral component interface (PCI) bus in a single burst cycle.

Other examples of the use of a tiled memory organization for storing display images include U.S. Pat. No. 5,815,168, which discloses a display controller for receiving and storing display data in memory in a tiled addressing format. U.S. Pat. No. 5,675,826 discloses a plurality of tiled memories in which data stored in the tiled memories is offset relative to each other by a delay unit upon writing of the data into the memory units. U.S. Pat. No. 5,263,136 discloses an image memory management system for tiled images.

Despite the widespread use of tiled memories and improved processor performance, there is still a need for a solution to the problem of how to achieve fast loading of texture data in a computer graphics system.

SUMMARY OF THE INVENTION

The present invention comprises as apparatus for loading texture data into a tiled memory. In one embodiment the apparatus comprises state machine logic to generate a sequence of addresses for writing a cacheline of texture data into the tiled memory according to Y-major tiling. The cacheline comprises quadwords (QWs) 0–3, wherein the sequence corresponds to an ordering of the QWs 0–3. The ordering consisting of either: (a) QW0, QW1, QW2, QW3; (b) QW1, QW0, QW3, QW2; (c) QW2, QW3, QW0, QW1; or (d) QW3, QW2, QW1, QW0, depending upon a starting address.

BRIEF DESCRIPTION OF THE DRAWINGS

The present invention will be understood more fully from the detailed which follows and from the accompanying drawings, which however, should not be taken to limit the invention to the specific embodiments shown, but are for explanation and understanding only.

DETAILED DESCRIPTION

A method and apparatus for fast loading of texture data is described. In the following description, numerous specific details are set forth, such as specific memory sizes, circuit structures, hardware implementations, etc., in order to provide a thorough understanding of the invention. It will be obvious, however, to one skilled in the art, that these specific details may not be needed to practice the present invention.

In a personal computer graphics subsystem, texture mapping is an affordable technique to bring richness and reality into graphical display scenes. Typically, the central processing unit (CPU) loads the textures into the memory before the application program begins using the data. For the end-user, it is critical to reduce the loading time, as he must wait for the textures to be loaded before the application can start. The present invention solves this problem by providing fast texture loading within an efficient hardware implementation.

Figure 1:
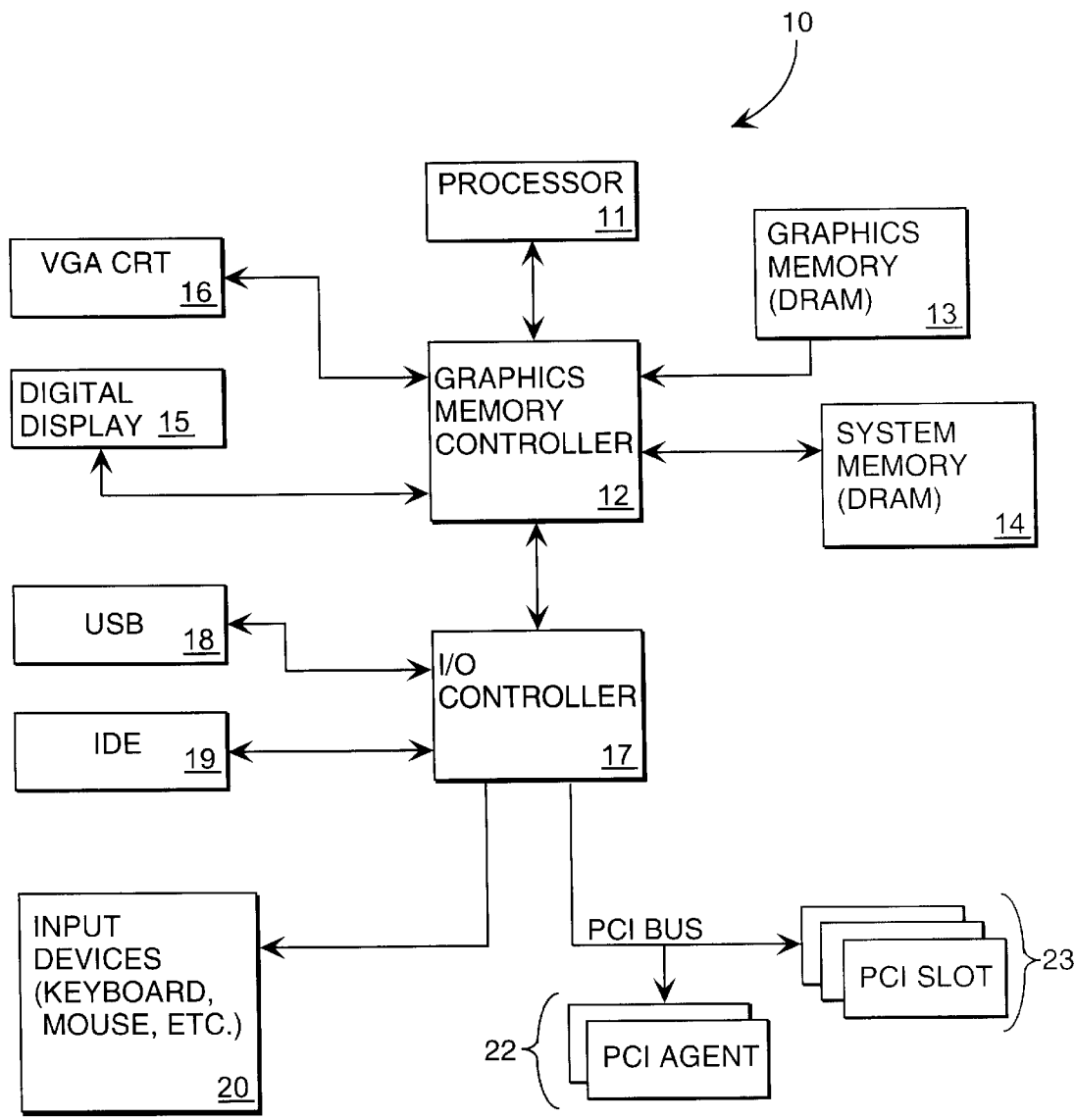
FIG. 1 is a diagram of one possible implementation of a computer graphics processing system in accordance with the present invention.

Referring to FIG. 1, a general block diagram of one embodiment of a graphics processing system 10 implemented in accordance with the present invention is shown. Graphics processing system 10 includes a processor 11 coupled to a graphics memory controller hub 12. Essentially, graphics memory controller 12 functions as a first bridge element providing a communication path between host processor 110, system memory 14, graphics memory 13, and various display devices, which may include a video graphics accelerator cathode ray tube (VGA CRT) device 16 and/or a digital display 15. Graphics memory 13 is coupled to graphics memory controller 12 via a dedicated graphics bus 24, whereas system memory 14 is coupled to graphics memory controller 12 of via system bus 25. Graphics memory 13 and system memory 14 are both arranged as tiled memories in accordance with one embodiment of the present invention.

Both memories 13 and 14 may comprise ordinary dynamic random-access memory (DRAM) devices.

Graphics memory controller hub 12 also interfaces with an input/output (I/O) controller hub 17 in the system diagram of FIG. 1. An assortment of peripheral devices may be coupled to I/O controller 17 via a Peripheral Component Interconnect (PCI) bus. These peripherals are represented in the example of FIG. 1 as multiple PCI agents 22 and devices connected to a plurality of PCI slots 23. These peripheral devices may include one or more graphics controllers or a network interface card coupled to a private internal network.

I/O controller 17 is also shown coupled to an intelligent drive electronics (IDE) device 19, which may control a hard disk drive and/or a compact disk read-only memory (CD ROM) player (not shown); and a Universal Serial Bus (USB) connector 18, which may be coupled to a publicly accessible network (e.g., the Internet). I/O controller 17 may additionally be coupled to an I/O bus (e.g., an Industry Standard Architecture bus that provides a communication path for various other I/O peripherals. By way of example, a super I/O controller 28 is shown connected to I/O controller 17. Super I/O 28 is coupled to a number of input and/or output devices, some of which may include a hard copy device (e.g., a printer), a cursor control device (e.g., mouse, trackball, touch pad, joystick, etc.), an alphanumeric keyboard or a modem. These additional devices are collectively represented in FIG. 1 as element 20.

Additionally, a non-volatile memory element 29 may be coupled to I/O controller 17. Non-volatile memory element 29, which may comprise a flash memory, is ordinarily utilized to store basic input/output system (BIOS) information used by the graphics system 10 during its boot sequence.

In the specific embodiment described below, processor 11 is of a type that is manufactured to be compatible with the well-known Intel® Architecture (i.e., x86 architecture) such that processor 11 operates in accordance with the x86 addressing scheme.

As discussed previously, a tiled memory architecture is an efficient method of utilizing memory space in a memory subsystem. Tiling allows the graphics engine to access memory faster without causing an excessive number of page misses in the memory subsystem. Graphics virtual memory can be tiled into different ways: X-major tiling and Y-major tiling. In X-major tiling, two contiguous quadwords in the X-direction are consecutive in physical memory. (Note that a quadword denotes four words, with each word comprising two bytes of data. An octalword denotes eight words, or 16 bytes of data.)

Figure 2A:
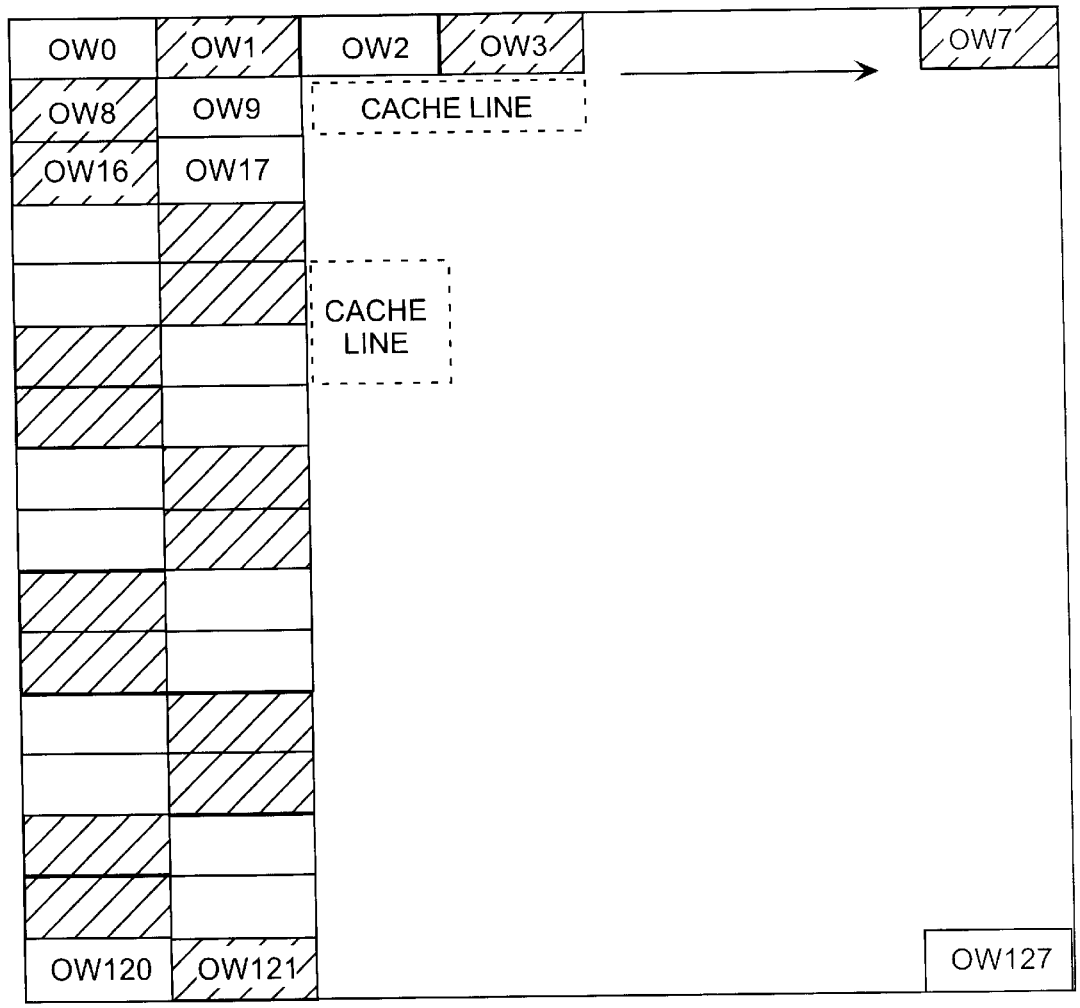
FIGS. 2A & 2B are examples of X-major and Y-major tiling in a memory organized in accordance with one embodiment of the present invention.

An example of X-major tiling is shown in FIG. 2A. The X-major tiled memory of FIG. 2A comprises 2 KB of memory space organized as eight octalwords wide by sixteen lines high. It is understood that each octalword comprises two quadwords. The crosshatched portions of the memory of FIG. 2A denote those areas accessible via a first channel (e.g., channel 1) of the memory, whereas those portions without crosshatching denote areas of memory accessible via a second channel (e.g., channel 0).

Figure 2B:
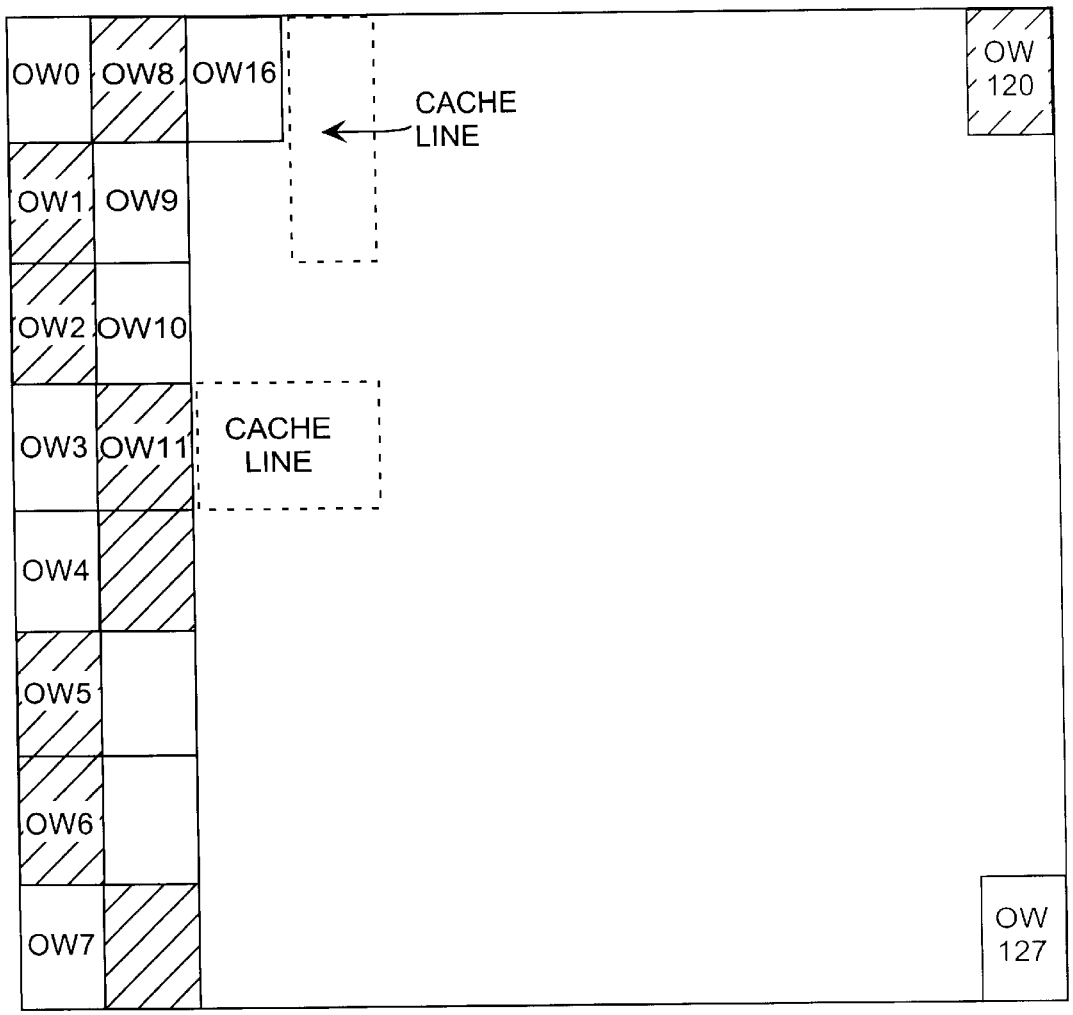

FIG. 2B is a corresponding example of a 2 KB tiled memory with Y-major tiling. In Y-major tiling, two contiguous quadwords in the Y-direction are consecutive in memory.

Practitioners familiar with the computer graphics arts will appreciate that the type of tiling used for any given surface depends on the operand access pattern exhibited by the related graphics engine. That is, the tiling structure is established and known by the graphics driver hardware. The host processor lacks understanding of the tiling structure generated in the graphics memory. Basically, what this means is that when the processor receives an instruction to load texture data into a particular area of memory, it simply fetches the tiling address and begins sending out the texture data. However, since the memory is tiled, there is a need for an operation to convert the virtual addresses that the host processor is writing to the tiled address space, and thus the physical address space. It is this need that is satisfied by the present invention.

The texture engine, which typically resides within the graphics processor, usually operates on a square quantity of texels. Based on the depth of the texel, it normally accesses two contiguous quadwords in the Y-direction. The present invention advantageously recognizes that Y-major tiling is more efficient for the texture engine, and therefore loads texture data from the processor into memory in the Y-direction.

It is important to recognize that when the texture is loaded into a X-major tiled surface a single cache line (i.e., four quadwords) at a time, four quadwords are contiguous in memory. This means that a single request can be issued to the memory controller to load the cache line of data. On the other hand, when the texture is a Y-major tiled surface that is not the case; the requests for the four quadwords need to be fragmented before tiling the address. Fragmentation, according to the present invention, is the act of generating individual addresses for each quadword, given that the input data stream consists of a four-quadword chunk having a specified starting address. The present invention first fragments in the desired order, and then tiles the addresses before they are converted to physical addresses (using a translation look-aside buffer).

In the presently described embodiment, the host processor generates addresses for writing a cache line of texture data in accordance with four different sequences. These sequences are listed in the table shown in FIG. 3. The first sequence, sequence "A", starts with quadword 0, followed by quadwords 1, 2 and 3. Sequence "B" has a quadword ordering of 1, 0, 3 and 2. Sequence "C" has a quadword ordering of 2, 3, 0 and 1. And sequence "D" has a quadword ordering of 3, 2, 1 and 0. These four different sequences denote the four different quadword orderings obtained from the cache line of data, corresponding to the different ways that the processor outputs the texture data.

Figures 3, 4:
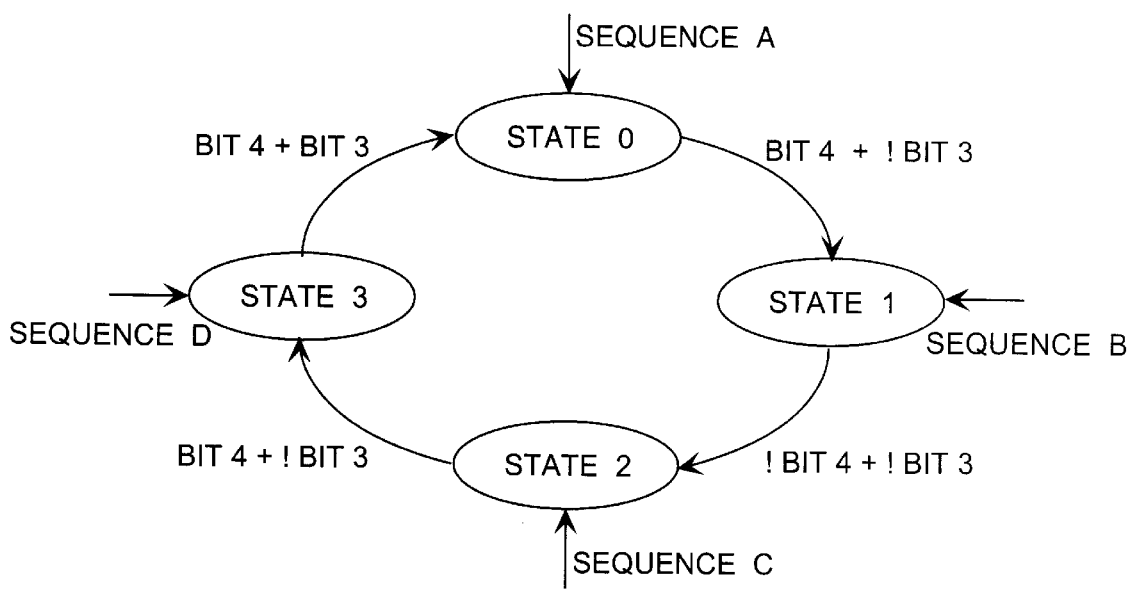
FIG. 3 is a table listing various quadword address ordering sequences in accordance with the present invention.
FIG. 4 is a state diagram illustrating one embodiment of the present invention.

A finite state machine implementation of the present invention is shown in FIG. 4. States 0–3 represent the starting point corresponding to the four different sequences described above. That is, based on the starting address, the finite state machine begins in one of these four states; it then generates the output addresses for the quadwords as it transitions around to each of the different states. For example, if the starting address indicated quadword sequence "A", the entry point for the finite state machine would be state 0. If the starting address indicated quadword sequence "B", the entry point for the finite state machine would be state 1, and so on. Sequencing in this manner is beneficial in the storage of texture data into a tiled memory since it can be accessed quickly by the graphics processor, and also written to quickly by the host processor.

It is worth noting that only two memory address bits—bits 3 & 4—are utilized for the state transitions. (Practitioners familiar with the computer arts will understand that the "+" symbol in FIG. 4 represents a logical AND operation, whereas the "!" symbol denotes the complement of the bit value.)

As implied by the finite state machine of FIG. 4, the logic to generate the three other addresses (other than the starting address) may be implemented by a pair of flip-flops. The logic takes advantage of the fact that, from the first (starting address) fragment to the second address, only bit 3 of address [31:0] needs to be flipped. From the second fragment to the third, only bits 3 & 4 are flipped (from the previous value). Finally, from the third fragment to the fourth, again only bit 3 needs to be flipped.

Thus, a two flip-flop logic embodiment covers all of the four orderings of cache line data listed in the table of FIG. 3. This simple, yet elegant implementation makes processor address ordering for the loading of texture data on a par with regular addressing in terms of speed and resources.

We claim:

1. Apparatus for loading texture data into a tiled memory comprising:
   state machine logic to generate a sequence of addresses for writing a cacheline of texture data into the tiled memory according to Y-major tiling, the cacheline comprising quadwords (QWs) 0–3,
   wherein the sequence corresponds to an ordering of the QWs 0–3 consisting of either: (a) QW0, QW1, QW2, QW3; (b) QW1, QW0, QW3, QW2; (c) QW2, QW3, QW0, QW1; or (d) QW3, QW2, QW1, QW0, depending upon a starting address.

2. The apparatus of claim 1 wherein the state machine logic comprises a pair of flip-flops.

3. The apparatus of claim 1 wherein the quadwords are contiguous.

4. The apparatus of claim 1 wherein the starting address comprises bits [31:0].

5. The apparatus of claim 4 wherein a first address in the sequence corresponds to the starting address and a second address in the sequence is generated from the first address by flipping bit 3 of the starting address.

6. The apparatus of claim 5 wherein a third address in the sequence is generated from the second address by flipping bit 3 and bit 4 of the second address.

7. The apparatus of claim 6 wherein a fourth address in the sequence is generated from the third address by flipping bit 3 of the third address.

8. A graphics processing system for fast loading of texture data comprising:
   a host processor;
   a graphics memory controller coupled to the host processor;
   a tiled memory coupled to the graphics memory controller;
   wherein the host processor includes state machine logic to generate a sequence of addresses for writing a cacheline of texture data into the tiled memory according to Y-major tiling, the cacheline comprising quadwords (QWs) 0–3, the sequence corresponding to an ordering of the QWs 0–3 consisting of either: (a) QW0, QW1, QW2, QW3; (b) QW1, QW0, QW3, QW2; (c) QW2, QW3, QW0, QW1; or (d) QW3, QW2, QW1, QW0, depending upon a starting address.

9. The graphics processing system of claim 8 further comprising:
   a display device coupled to the graphics memory controller.

10. The graphics processing system of claim 8 wherein the tiled memory comprises a graphics memory of DRAM devices.

11. The graphics processing system of claim 8 wherein the state machine logic comprises a pair of flip-flops.

12. The graphics processing system of claim 8 wherein the quadwords are contiguous.

13. The graphics processing system of claim 8 wherein the starting address comprises bits [31:0].

14. The graphics processing system of claim 13 wherein a first address in the sequence corresponds to the starting address and a second address in the sequence is generated from the first address by flipping bit 3 of the starting address.

15. The graphics processing system of claim 14 wherein a third address in the sequence is generated from the second address by flipping bit 3 and bit 4 of the second address.

16. The graphics processing system of claim 15 wherein a fourth address in the sequence is generated from the third address by flipping bit 3 of the third address.

17. A method of loading texture data into a tiled memory comprising:
   providing a starting address for writing a cacheline of texture data into the tiled memory according to Y-major tiling, the cacheline comprising quadwords (QWs) 0–3; and
   generating a sequence of addresses corresponding to an ordering of the QWs 0–3 consisting of either: (a) QW0, QW1, QW2, QW3; (b) QW1, QW0, QW3, QW2; (c) QW2, QW3, QW0, QW1; or (d) QW3, QW2, QW1, QW0, depending upon the starting address.

18. The method of claim 17 wherein the starting address comprises bits [31:0] and a first address in the sequence corresponds to the starting address, a second address in the sequence being generated from the first address by flipping bit 3 of the starting address.

19. The method of claim 18 wherein a third address in the sequence is generated from the second address by flipping bit 3 and bit 4 of the second address.

20. The method of claim 19 wherein a fourth address in the sequence is generated from the third address by flipping bit 3 of the third address.

* * * * *